Aug. 10, 1948.    F. J. LOWEY    2,446,892
METHOD OF SHAPING BIMETALLIC ARTICLES
Filed Oct. 23, 1943    4 Sheets-Sheet 1

INVENTOR:
FRANCIS J. LOWEY
BY C. Thomas Cox
ATTORNEY.

Aug. 10, 1948.  F. J. LOWEY  2,446,892
METHOD OF SHAPING BIMETALLIC ARTICLES

Filed Oct. 23, 1943  4 Sheets-Sheet 2

INVENTOR:
FRANCIS J. LOWEY
BY C. Thomas Cox
ATTORNEY.

Aug. 10, 1948.  F. J. LOWEY  2,446,892
METHOD OF SHAPING BIMETALLIC ARTICLES
Filed Oct. 23, 1943  4 Sheets-Sheet 3
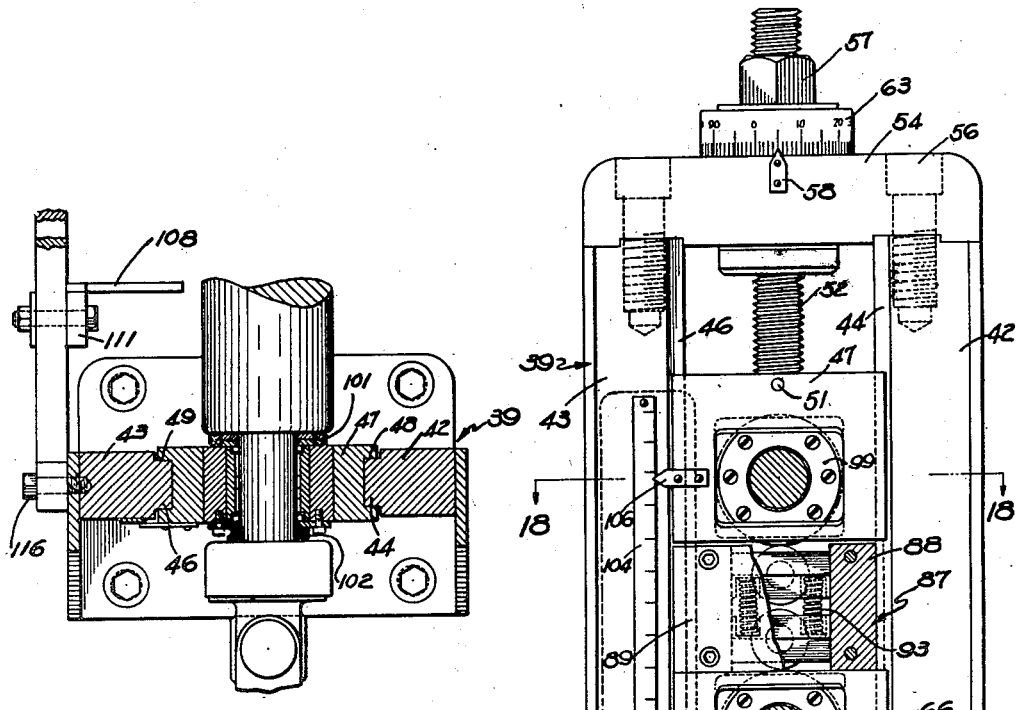
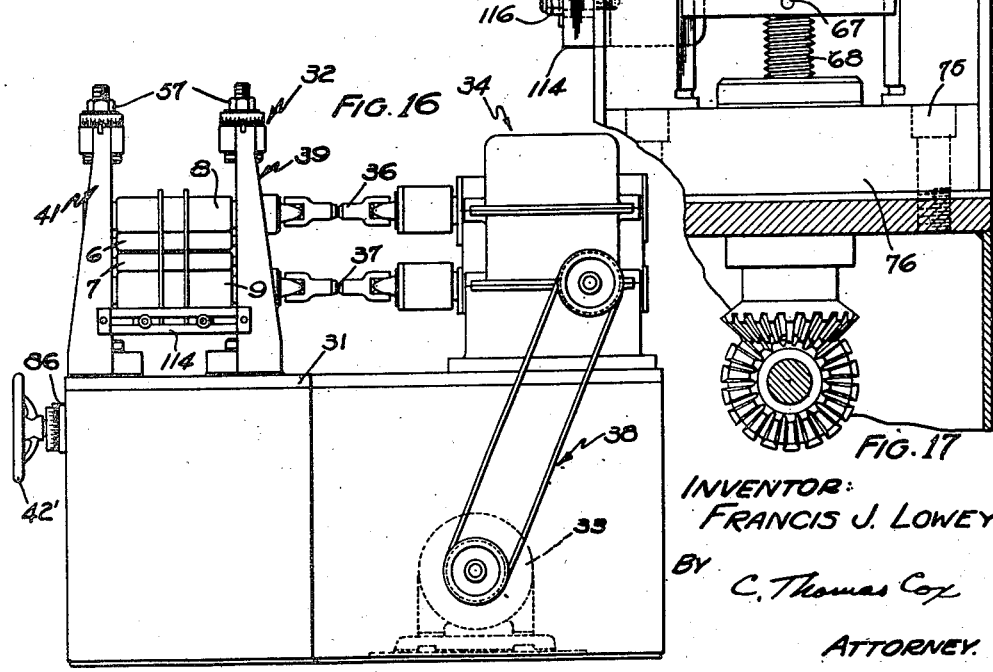
INVENTOR:
FRANCIS J. LOWEY
BY C. Thomas Cox
ATTORNEY.

INVENTOR:
FRANCIS J. LOWEY
BY C. Thomas Cox
ATTORNEY

Patented Aug. 10, 1948

2,446,892

UNITED STATES PATENT OFFICE 2,446,892

METHOD OF SHAPING BIMETALLIC ARTICLES

Francis J. Lowey, Bay Village, Ohio, assignor to The S. K. Wellman Company, Cleveland, Ohio, a corporation of Ohio Application October 23, 1943, Serial No. 507,429

4 Claims. (Cl. 29—152.1)

This invention relates to a method of imparting a conical shape to bimetallic articles of the type having a sintered powdered metal facing layer integrally bonded to the face of a reinforcing member or backing of solid metal such as steel or copper.

Bimetallic articles of the type referred to are produced by pressing or briquetting metal powder of suitable composition and containing minor amounts of nonmetallic ingredients such as graphite and then heating the briquette so formed to a sintering temperature. Since the sintered metal powder is rather porous and of low tensile strength, it is desirable to provide a reinforcing member or backing of stronger metal and this is accomplished by conducting the heating or sintering step with the briquette held against a clean and properly prepared surface of a backing member. The heat of the sintering step causes the pressed powder to sinter together and to integrally bond to the backing member.

The necessity of pressing the powder to form the briquette and of pressing the briquette against the backing during the sintering and bonding step limits the process, as a practical matter, to the production of articles of flat configuration since it is difficult to press the powder to a curved shape and avoid uneven pressure and density. However, it is frequently desirable to produce bimetallic articles of curved form so that they can be used for shaft bearings or for brake shoes adapted to engage a cylindrical or conical surface. Thus, it is customary to shape or bend a flat bimetallic strip to curved shape by use of a bending press and suitable dies. If the flat bimetallic strip is to be bent so that the sintered powdered metal facing will be disposed on the inside of the curved strip, there is relatively little difficulty in accomplishing this in any bending press. However, attempts to bend the bimetallic articles so that the sintered facing is disposed on the outside of the curve or on the convex face of the backing member for use in an internal expanding brake, for example, have not been very successful due probably to the low tensile strength of the sintered layer. Attempts have been made to achieve a satisfactory bending method for articles having the sintered facing disposed on the outside, and one such method is described in Wellman Patent No. 2,289,311 issued July 7, 1942. In this patent, the sintered article is provided with a thin sheet metal reinforcing member which is integrally bonded to the sintered facing forming in effect a sandwich with the sintered material disposed between the thin sheet metal facing and the thick metal backing member. When such a sandwich article is bent in a press, the thin sheet metal facing stretches and holds the sintered layer together minimizing the cracking of the sintered layer. The process described in this patent, while quite successful, particularly for articles having a rather thin sintered metal facing and where the radius of bending is large, is rather complicated and expensive, cannot be accomplished very rapidly, and is inapplicable to blanks which are to be bent to small radii, such as one inch.

The co-pending application of the applicant and Charles H. Tower, Serial Number 520,162 filed January 29, 1944, describes a method for rapidly and smoothly bending a bimetallic article so that the sintered metal facing will be disposed on the outer or convex surface of the backing member. The invention there has its basis in the discovery that by controlled directional working of the sintered metal facing, the bimetallic strip may be caused to assume the desired cylindrical curvature.

The present invention constitutes an improvement over that disclosed in the co-pending application and is directed to the forming of an article of conical shape.

It is an object of the present invention to provide a new and improved method by which a bimetallic article may be readily and rapidly bent, curved, or otherwise formed to the desired conical curvature without injuring or cracking the facing.

It is a further object of the invention to provide a new and improved method of bending a bimetallic article to conical shape by the controlled elongation of the more plastic layer thereof.

It is a further object of the invention to provide a new and improved method for bending articles of the type having a sintered metal facing bonded to a less plastic reinforcing member of steel to a conical shape with the sintered facing disposed on the outer or convex surface of the reinforcing member.

Other and further objects and advantages of my invention will be apparent from the following description and the accompanying drawings in which:

Fig. 16 is a front elevation of suitable apparatus for carrying out my invention;

Fig. 17 is a side elevation with parts in section and on an enlarged scale of the apparatus of Fig. 16;

Fig. 18 is a horizontal section on line 18—18 of Fig. 17; and

Figure 1:
Fig. 1 is a plan view on a reduced scale of a flat bimetallic blank which is to be bent to cylindrical shape.
Figure 2:
Fig. 2 is a side elevation of the blank of Fig. 1.
Figure 3:
Fig. 3 is a vertical section on line 3—3 of Fig. 2.

Referring now to Figs. 1-3, I have illustrated generally at 1 a flat bimetallic blank which comprises the backing member 2 of solid metal such as steel or copper to which is integrally bonded the sintered metal facing 3. The bimetallic blank 1 may be formed in any suitable manner, but I prefer to construct it in the manner described in Wellman Patent No. 2,178,527 issued October 31, 1939. Generally speaking, the sintered facing comprises a pressed and sintered mixture of metal powders, such as copper, tin, and lead, to which minor amounts of nonmetallic substances, such as graphite and silica, are added. The powdered mixture is pressed under a pressure of about 11 tons per square inch to form a flat briquette which is then clamped against a clean and suitably prepared face of the metal backing member 2 and the whole heated to a temperature of from 1200-1500° F. for a sufficient length of time to sinter the metal powders together and to cause them to integrally bond to the backing member.

Figure 4:
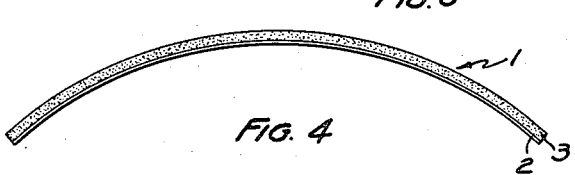
Fig. 4 is a side elevation of the blank of Figs. 1–3 after it has been formed to shape in accordance with the teachings of my invention.
Figure 14:
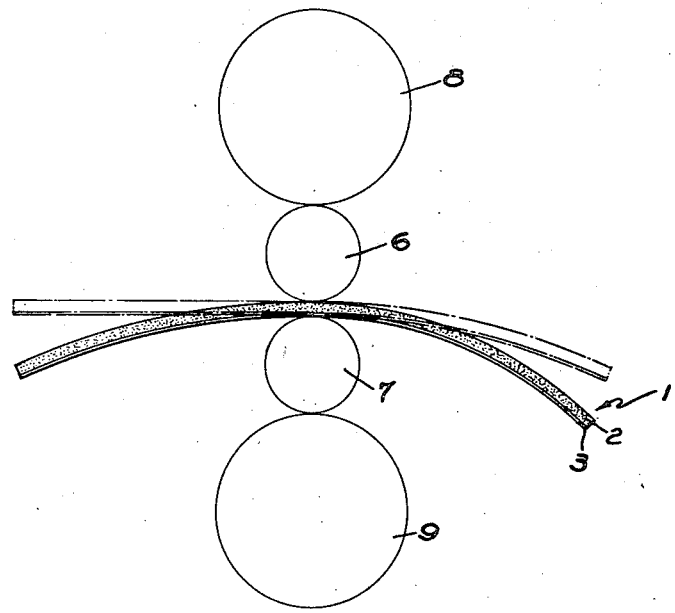
Fig. 14 is a diagrammatical showing of apparatus suitable for shaping the blank for Figs. 1-3 without utilizing the jig of Figs. 5 and 6.

The co-pending application Serial Number 520,162, referred to above, proposes to take the flat blank shown in Figs. 1-3 and bend it to curved formation, as shown in Fig. 4, with the sintered facing 3 disposed on the outer or convex face of the backing member 2. It is disclosed there that progressive mechanical working of successive laterally extending areas of the sintered facing 3 will cause the bimetallic blank 1 to assume a longitudinally curved formation and that the degree of curvature can be controlled by regulating the degree of mechanical working. It is disclosed there that it is possible to utilize a pair of opposed pressure rolls between which the bimetallic blank is passed. In Fig. 14, I have illustrated diagrammatically apparatus of this type comprising a pair of opposed pressure rolls 6 and 7 between which the bimetallic blank is passed. In this illustration, the apparatus is provided with backing rolls 8 and 9 which serve to hold the pressure rolls 6 and 7 in place and to rotate them.

By suitably selecting the diameter of the rolls, their speed of rotation, and the pressure they apply to the bimetallic blank, it is possible to bend the bimetallic blank to an accurate, predetermined curvature.

I am not too positive as to the actual theory of operation, but it is my opinion that the curvature obtained is due to the fact that the sintered facing 3 is more plastic than the solid metal backing member 2 and that pressure applied transversely to both the sintered facing and the backing member and in a direction longitudinally of said facing and member results primarily in elongation of the sintered facing 3. This elongation of the sintered facing 3 causes the bimetallic article to bend and assume a curved formation.

The terms plastic and plasticity may be used to indicate the flowable or deformable properties of the sintered material which permit the elongation and cause the bending. While sintered metallic material is generally of low tensile strength in comparison with solid metal, such as steel, it does possess the property of being plastic or flowable to a rather high degree. In this respect, it may be said that it is of high ductility in that it is capable of being deformed and hammered out.

By suitably adjusting the spacing apart of the pressure rolls 6 and 7 so as to obtain the desired reduction in thickness and mechanical working of the sintered facing 3, it is possible to bend the bimetallic blank to desired configuration in one pass between the pressure rolls, although it is generally preferable to use more than one pass through the rolls and gradually increase the pressure. The dotted lines in Fig. 14 illustrate the position of the bimetallic blank on the first pass between the pressure rolls. The solid lines indicate the position of the bimetallic blank on its final pass between the rolls 6 and 7.

Since in practice the bimetallic blanks occasionally have areas of different densities and hardness, it is sometimes desirable to provide a jig or guide in order to more accurately control the degree of curvature. Thus, in Figs. 5 and 6, I have illustrated a hardened steel jig or guide 11 comprising a cylindrical steel member 12 provided with tabs or lugs 13 welded thereto and which cooperate with the member 12 to define a partial channel for reception of the bimetallic blank. Of course, the lugs shown may be eliminated if desired or substituted by continuous vertical shoulders.

Figure 15:
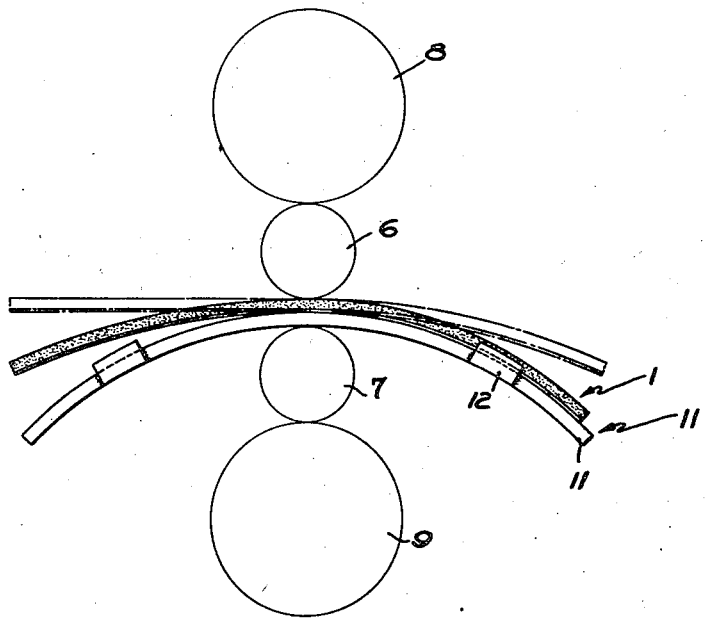
Fig. 15 is a diagrammatical illustration similar to that shown in Fig. 14 but illustrating the use of the jig of Figs. 5 and 6.

In Fig. 15, I have illustrated the operation of the pressure rolls 6 and 7 when operating with the jig 11. The operation is essentially the same as that shown in Fig. 14 but the jig 11 serves to limit and control the bending of the bimetallic blank 1. It is, of course, apparent that the cylindrical member 12 of the jig 11 has an outer surface whose radius of curvature is equal to the inside radius of the backing member 2 of the bimetallic blank 1 after it has been bent to shape.

The use of such a jig is desirable in production where unskilled labor must be relied upon since it provides a ready guide by which the workman can determine if the proper curvature has been obtained. In large production runs where the machinery cost is a relatively minor matter, it is preferable to replace one of the pressure rolls 6 or 7 with a roll having the same radius as that desired in the blank as curved. This latter practise, of course, eliminates the necessity for a jig since its function is served by the roll.

It should be kept in mind, however, that while the speed and diameter of the pressure rolls have an effect on the bending operation, the major item controlling the bending is the extent of mechanical working by the rolls. The degree of bending obtained is proportional to the degree of working and thus bending to a smaller radius merely necessitates a closer spacing together of the pressure rolls to obtain a greater elongation of the sintered facing. The jig, while helpful to some extent in controlling the bending, especially if the facing is of non-uniform density, serves primarily as a guide. Even with the use of a jig it is possible to over-bend or obtain a smaller radius of curvature than is desired in the particular blank being bent if the rolls are spaced too close together.

It is apparent that the above observations to the effect that greater mechanical working by the rolls results in a smaller radius of bending are true only if applied to any one particular combination of facing composition with backing member and that the degree of bending obtained for any given setting of the rolls will vary as different combinations are used. In other words, different combinations will require different settings of the rolls in order to achieve the same degree of bending. As I have indicated above, the major item controlling the degree of bending is the extent of mechanical working by the rolls which is dependent not only on the setting of the rolls but also on the particular combination of sintered facing and backing used. By different combinations is meant combinations of facing and backing which differ not only in chemical composition of the respective parts but also differ in relative thickness and plasticity of the parts.

It is my opinion that the major requirement that any particular combination must meet in order that it may be satisfactorily formed to shape by my method of directional or progressive mechanical working is that the sintered facing should be of greater plasticity than the backing. This requisite is met by practically all of the bimetallic articles produced in commercial production. Some unusual combinations have been produced in which the facing is of less plasticity than the backing member as, for example, in a combination wherein the facing comprises a relatively hard composition containing iron and carbon and the backing member is of a soft metal such as annealed copper. A combination of this type when progressively mechanically worked will assume a reverse bending. In other words, a combination of this type when bent will have the facing disposed on the inner or convex side of the backing. The invention may be practised on combinations of this type to achieve such reverse bending but this application is of relatively little importance since it is relatively easy to form such shapes in a bending press.

The method of the invention is applicable to the shaping or bending of any bimetallic blank which has layers of different plasticity, but it is primarily applicable to bimetallic articles having a sintered powdered metal facing layer integrally bonded to the face of a reinforcing member or backing of solid metal such as steel or copper and in which the facing is of greater plasticity than the backing since it is exceedingly difficult to bend these articles to a curved shape with the facing disposed on the outside of the curve. Bimetallic articles in which both layers are of solid metal having different plasticity are usually readily formed to shape in any bending press or the like but bimetallic articles having a sintered metal layer present greater difficulties due to the relatively low tensile strength and frequent non-uniformity of the sintered powdered metal facing.

The progressive mechanical working of the sintered powdered metal facing results in densification as well as elongation. This densification or compression of the facing layer gives a greater apparent hardness of the facing as measured with a Rockwell hardness machine. For example, a bimetallic article ½" thick (the steel backing being ⅛" thick and the sintered layer being ⅜" thick) before bending had a Rockwell hardness of −18 as given on the H scale using a ¼" steel ball and a 60 kilogram load while after bending to a 2¾" radius it had a Rockwell hardness of 104 on the same scale. This increase in hardness is a surface phenomenon primarily, and in this case, the increase in hardness diminished progressively from the surface inward and was not appreciable at a depth of $\frac{1}{16}$".

For some purposes and specific applications, it has been recognized in the art that cold working of a sintered facing to obtain a greater density and surface hardness is desirable. The present method achieves this as one incident to the bending operation.

As one specific example, I have utilized pressure rolls having a diameter of 3" and rotating at a peripheral speed of about 2½" per second to bend a bimetallic blank having a total thickness of $\frac{3}{16}$" (the backing member having a thickness of $\frac{1}{16}$" and the sintered layer having a thickness of ⅛") to a radius of 14⅞". To obtain this bending, a reduction in thickness of .012" was necessary with the particular composition utilized. In this instance, the sintered material was a copper, tin, lead, graphite composition.

By using pressure rolls of lesser diameter, I have bent similar blanks to a radius as small as 1" without damaging the sintered facing or the bond between the sintered facing and the backing member. I have also bent blanks having a sintered facing ½" thick bonded to a backing layer of steel ⅛" thick to a radius as small as 2¾" without damaging the material; however, a reduction in thickness of approximately $\frac{1}{16}$" was necessary. In materials of this great thickness, some minor surface cracks will appear, but these are very shallow and do not extend more than a few thousandths of an inch in depth and can be readily removed by sandblasting.

While the bending occurs because of the elongation of the sintered facing, there is some reduction in thickness thereof as a necessary incident thereto; thus, it is necessary to start with a blank having sufficient thickness to produce a curved article of requisite thickness. As a general matter, the process is not intended as one to reduce the thickness of a blank. In other words, the flat blank should be of practically finished dimensions before being bent, only sufficient extra thickness being allowed to accommodate the reduction in thickness incident to the bending operation.

Figure 7:
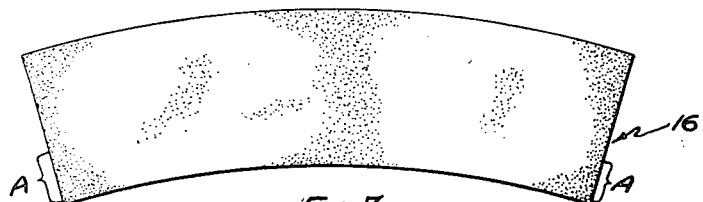
Fig. 7 is a plan view on a reduced scale of a flat bimetallic blank suitable for forming articles of conical configuration.
Figure 8:
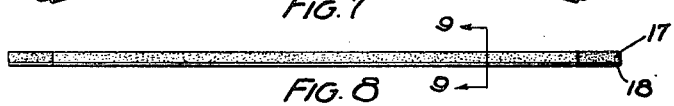
Fig. 8 is a side elevation of the blank of Fig. 7.
Figure 9:
Fig. 9 is a vertical section on line 9—9 of Fig. 8.

Referring now to Figs. 7-9, I have illustrated a bimetallic blank 16 suitable for forming articles of conical shape. This bimetallic blank 16 comprises a sintered facing 17 integrally bonded to a solid metal backing member 18 and may be formed in the same manner as that described in regard to the blank shown in Figs. 1-4. As shown in Fig. 7, the blank 16 is of segmental or arcuate form and is so dimensioned that on bending to a conical shape it will assume the form shown in Figs. 10 and 11. A bimetallic article of this conical shape is frequently used in cone type brakes and clutches for tractors and farm machinery.

In order to bend the blank of Figs. 7–9 to conical shape, I have found that it is necessary to differentially work the facing. That is, the degree of mechanically working or elongation of the facing is gradually increased in amount from one side to the other of each laterally extending area of the facing. Thus, in Figs. 7 and 9, if the longitudinal zone or portion indicated by the bracket and letter A is compressed by the pressure rolls 6 and 7 to a higher degree than the remaining portion of the blank, then the blank will be formed to cone shape due to the unequal elongation of the portions of the facing.

Figure 12:
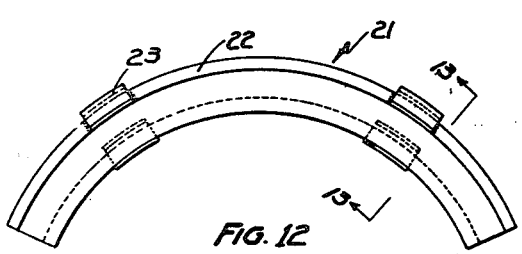
Fig. 12 is a side elevation of a suitable jig which may be used in shaping the blank of Figs. 7-9.
Figure 13:
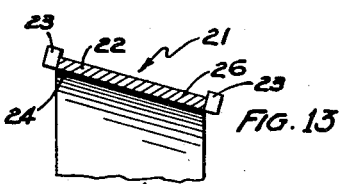
Fig. 13 is a vertical section on line 13—13 of Fig 12.

One suitable manner of accomplishing this is by providing a jig which will accomplish this. Thus, in Figs. 12 and 13, I have illustrated generally at 21 a jig having a conical steel member 22 with spaced lugs 23 welded thereto. The conical member 22 of this jig has an outer surface of configuration corresponding to that which it is desired to obtain on the blank. But it is to be noted that the left-hand side 24 of the conical member 22 is of less thickness than the right-hand side 26 as shown in Fig. 13. As the blank of Figs. 7–9 is passed between the pressure rolls 6 and 7 with the jig 21 of Figs. 12 and 13, the zone A of the bimetallic blank will be subjected to higher pressure than the remainder of the blank due to the tapered cross section of the jig, and the sintered layer of this zone will be elongated to a greater degree. This greater elongation of the zone A results in greater curvature of this portion of the bimetallic blank and causes the blank to assume a conical configuration. It is, of course, obvious that the zone A should not be well-defined and should merge smoothly with the remainder of the blank. In other words, the cylindrical member 22 of Fig. 13 has a tapered cross section as seen in Fig. 13.

Figure 11:
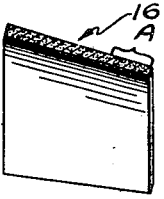
Fig. 11 is a vertical section on line 11—11 of Fig. 10.

The tapered cross section of the jig results in the imparting of a tapered cross section to the blank as illustrated in Fig. 11; however, both Figs. 11 and 13 exaggerate the taper for clarity. In actual practise, the taper is so slight as to be immaterial in the finished blank.

For example, the jig need only have a taper of .005", that is, the left-hand side of the conical member 22 of Fig. 13 need only be .005" thinner than the right-hand portion of the member, in order to produce a conical shape from a bimetallic blank having a length of 13", a width of 3", and a total thickness of ¼" (a backing member $\frac{7}{16}$" thick and a sintered facing $\frac{3}{16}$" thick. A jig of this construction will bend this blank to a curvature such that the blank will have a large diameter of 11¾" and a small diameter of 10". The curved or conical article will, of course, have a difference in thickness of .002" to .003" between the edges, but this is usually immaterial. However, if necessary, the shaped blank may be ground to uniform thickness.

Figure 10:
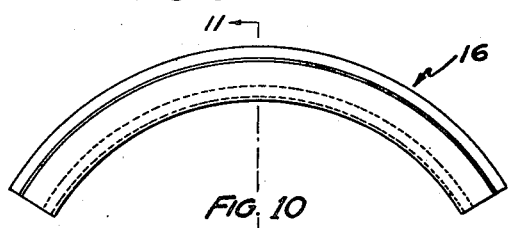
Fig. 10 is a side elevation of the blank of Figs. 7-9 after it has been formed to conical shape in accordance with the teachings of my invention.

In bending the blank of Fig. 7 to conical shape as shown in Fig. 10, pressure rolls 6 and 7 having a diameter of 2" were used and were rotated at a peripheral speed of about 2½" per second. The pressure rolls were spaced apart so as to produce a reduction in thickness of the facing of about .020" in two passes between the rolls.

While I have described the use of a jig having a tapered cross section to obtain the bending of the blank to conical shape, I do not intend to be limited to this method or apparatus since there are other ways in which this result can be accomplished. For example, if it is desired to proceed as in Fig. 14 without the aid of a jig, the same result may be obtained by having at least one of the pressure rolls 6 and 7 of tapered or conical configuration or by using cylindrical rolls which have their axes disposed at an angle so that the bimetallic blank of Figs. 7–9 is subjected to greater pressure at one side than at the other.

In Figs. 16–19, I have illustrated a suitable apparatus embodying a pair of opposed pressure rolls and which may be used to carry out the procedures described above, but it is to be understood that any suitable apparatus having a pair of opposed pressure rolls and in which the spacing and speed of the rolls may be varied can be utilized. Fig. 16 generally illustrates the apparatus which comprises the frame or base 31 which carries the roll unit generally illustrated at 32, the motor 33, and the gear reduction drive 34. The gear reduction drive 34 is provided with two drive shafts 36 and 37 which connect the gear drive 34 with the backing rolls 8 and 9. These shafts 36 and 37 are of telescoping construction and are provided with universal joints for connection to the rolls and the gear drive to permit vertical adjustment of the backing rolls 8 and 9. The motor 33 is connected by a belt and pulley arrangement 38 to the gear drive 34.

The roll unit 32 comprises side posts 39 and 41 which carry for vertical adjustment the backing rolls 8 and 9 and pressure rolls 6 and 7. All of these rolls are mounted for vertical movement and are adjusted by means of the handwheel 42' and adjustment nuts 57, all in a manner to be described in greater detail hereinafter.

As shown in Figs. 17 and 18, the side post 39 is made up of the vertical spaced bars 42 and 43 which are provided with tongues 44 and 46 on their inner and facing edges. These bars and their tongues cooperate to form a vertical slideway for reception of the bearing blocks of the rolls 6—9. The side post 41 is of similar construction and will not be further described except to say that the parts thereof are the same as for side posts 39.

The upper backing roll 8 is provided with a bearing block 47 at each end thereof and each block is provided with grooves 48 and 49 on the edges thereof for sliding engagement with the tongues 44 and 46. The bearing block 47 is pinned at 51 to the lower end of the threaded shaft 52 which extends vertically through an opening 53, see Fig. 19, in the upper cross bar 54 which is bolted at 56 to the upper ends of the bars 42 and 43. Disposed within the opening 53 is a nut 57 in threaded engagement with the threaded shaft 52. The nut 57 is provided with a shoulder 58 on the lower side thereof and a thrust washer 59 is located between this shoulder and the upper cross bar 54. The nut 57 extends through the opening 53 and is provided at the upper end with a collar 61 secured thereto by means of the setscrew 62. This collar 61 serves as a thrust collar to prevent downward movement of the nut 57. As shown in Fig. 17, the upper end of the nut 57 is provided with hexagonal surfaces for engagement by a suitable wrench to rotate the same and move the bearing block 47 vertically. Disposed on the outside of the collar 61 is a collar 63 secured thereto by means of a setscrew 64 and bearing on the outer face thereof suitable graduations as illustrated in Fig. 17. The upper cross bar 54 is provided with a pointer 58 for cooperation with the graduations on the collar 63. The side post 41 is of similar construction and is also provided with a graduated collar. By means of the two nuts and graduated collars, it is possible to individually adjust the bearing blocks for each end of the roll 8 to achieve a predetermined setting and position of the roll. The backing roll 9 is provided at each end with a bearing block 66 which is of similar construction to that of the bearing block 47 except that it is pinned at 67 to the upper end of a threaded shaft 68. The threaded shaft 68 engages a nut 69 which is provided at the upper end with a shoulder 71 and thrust washer 72 and at the lower end with a collar 73 held in place by a setscrew 74. The shoulder 71 and collar 73 engage the upper and lower surfaces respectively of the lower cross member 76 and restrain the nut 69 from vertical movement. The lower cross member 76 is welded to the lower ends of bars 42 and 43 and is bolted at 75 to the base 31. The lower end of the nut 69 is hollow and receives the shank 77 of a bevel gear 78 which is held in place by a setscrew 79. This gear 78 is in mesh with a bevel gear 81 which is secured by setscrew 82 to a horizontal shaft 83 suitably journaled in the base 31 of the apparatus. As has been stated, the construction of the side post 41 is similar and it is also provided with gears as shown in dotted lines in Fig. 19. The shaft 83 is provided at one end with a handwheel 42 and graduated collar 84 which cooperates with a pointer 86 secured to the machine. Rotation of the handwheel 42 serves to rotate the nuts 69 of each side post 39 and 41 and causes the bearing blocks 66 of each end of the lower backing roll 9 to move vertically.

By the construction thus described and illustrated, the backing roll 9 may be moved vertically by rotation of the handwheel 42 while the backing roll 8 may be moved vertically by rotation of the individual nuts 57.

Disposed between the backing rolls 8 and 9 are the opposed pressure rolls 6 and 7. These rolls 6 and 7 are journaled in bearing blocks carried by the side posts 39 and 41 and are held apart by means of springs as will now be described. Each side post 39 and 41 slidably carries a bearing block 87, Fig. 17, which is made up of the vertical members 88 which are bolted to the connecting plate 89. Disposed between the members 88 are located the journal blocks 91 and 92, Fig. 19, and which are held in vertical spaced relation by means of the springs 93. Each journal block 91 and 92 is provided with a lined recess 94 for reception of the neck of the respective roll.

Figure 19:
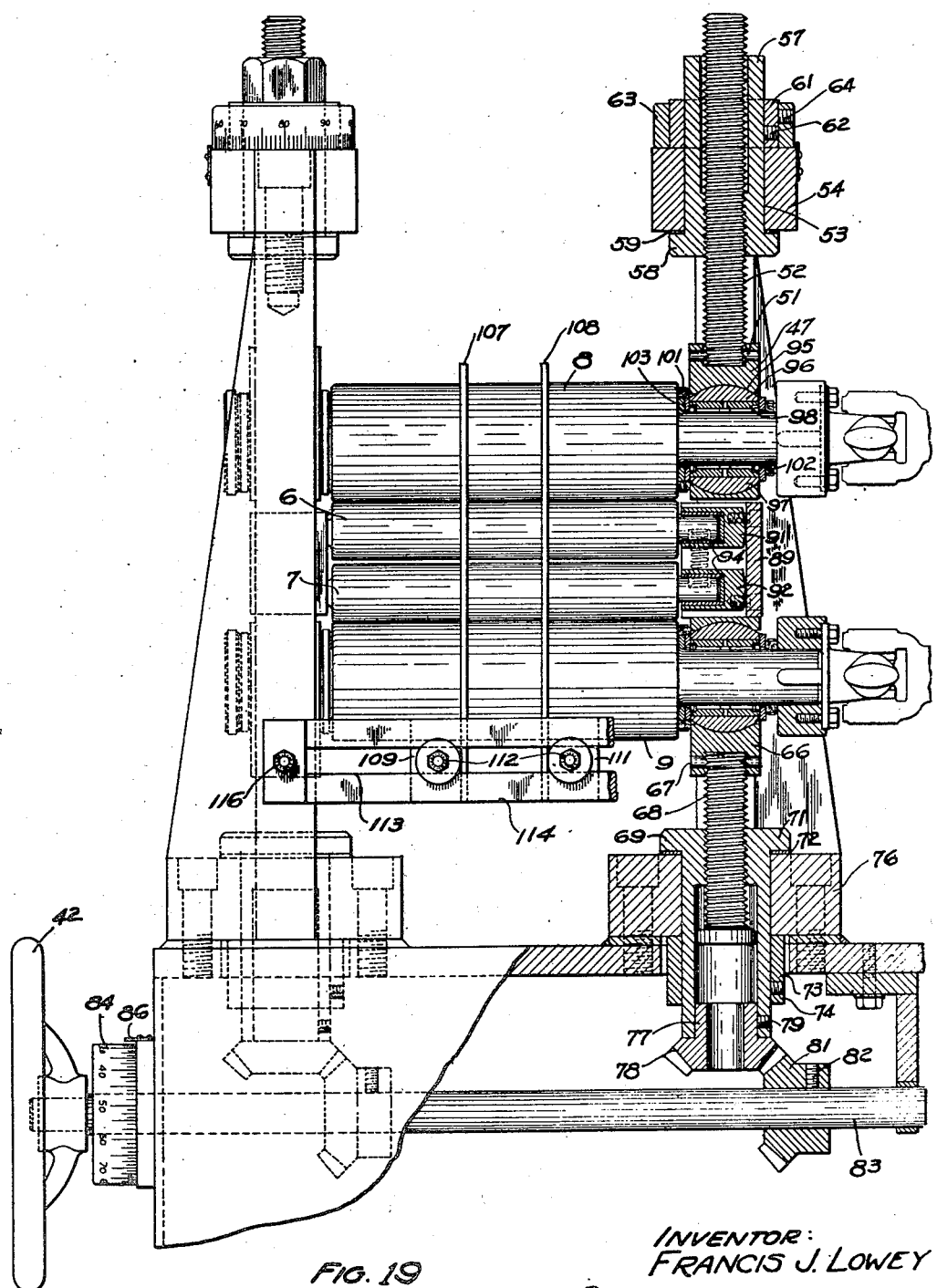
Fig. 19 is a front elevation of the apparatus of Fig. 17 with parts shown in section.

It is seen from Fig. 19 that the springs 93 cooperate to force the pressure roll 6 vertically against the backing roll 8 and to force the pressure roll 7 against the backing roll 9, leaving a space between the rolls 6 and 7 for reception of the bimetallic blank.

The bearing blocks 47 and 66 are provided with cylindrical bearings for reception of the bearings of the necks of the rolls 8 and 9. The bearing construction is the same for both blocks and only the upper block 47 will be described. The block 47 is provided with an opening 95, Fig. 19, which has a cylindrical cross section and receives the cylindrical segments 96 and 97 which carry the needle bearing 98. The needle bearing is held in place in the cylindrical segments 96 and 97 by means of end plates 99, Fig. 17. Packing rings 101 and 102, Fig. 19, are provided on each side of the needle bearing and a thrust washer 103 is disposed on the inner side to align the roll axially.

As shown in Fig. 17, the vertical bar 43 of the side post 39 has secured thereto a vertical graduated scale 104. To the outer face of each of the bearing blocks 47 and 66 is secured a pointer 106 for cooperation with the scale 104 to indicate the vertical position of the bearing blocks. A similar scale and pointer arrangement is provided for the other side post 41.

A pair of vertical guides 107 and 108 are located in front of the rolls of the machine and provide a means to guide the bimetallic blank into the machine. These vertical guides 107 and 108 are welded to blocks 109 and 111 which are secured to the cross bar 114 by bolts 112 which pass through the slot 113. This cross bar 114 extends across the face of the machine and is bolted at the ends at 116 to the side posts 39 and 41. Upon loosening the nuts 112, the vertical guides 107 and 108 may be adjusted laterally to vary the spacing between them.

Figure 5:
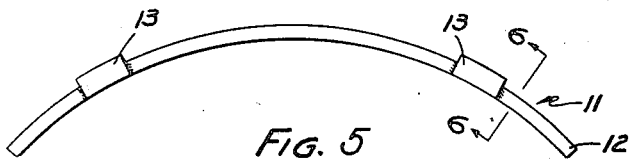
Fig. 5 is a side elevation of a jig which may be used to form the blank of Fig. 1.
Figure 6:
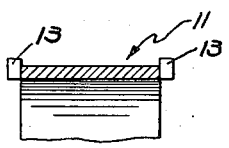
Fig. 6 is a vertical section on line 6—6 of Fig. 5.

In operation, the workman will adjust the nuts 57 at the upper end of the threaded shafts 52 so that the pressure rolls 6 and 7 are parallel. He will then adjust the handwheel 42 to move the lower backing roll 9 until the pressure rolls 6 and 7 are disposed the required distance apart, which will be slightly less than the total thickness of the bimetallic blank and the jig if one is used. He will then start the motor 33 which will rotate the backing rolls 8 and 9 and drive the pressure rolls 6 and 7. A bimetallic blank is then fed between the pressure rolls 6 and 7 and passed therebetween. If the single pass does not achieve the desired bending, then the handwheel 42 will be turned to slightly reduce the spacing between the pressure rolls and the blank passed between them again. With very little experience the workman can operate the machine so that bimetallic blanks may be accurately bent to desired shape on only one or possibly two passes between the pressure rolls. In some instances it may be desirable to use a jig, as illustrated in Figs. 5 and 6, but such use is not essential. If cone segments are to be formed, he may utilize a jig such as shown in Figs. 12 and 13, or may adjust one nut 57 so that the upper backing roll 8 and its pressure roll 6 are disposed at a slight angle to the lower pressure roll 7 and backing roll 9, the cylindrical construction of the bearings 96 and 97 being adapted to permit this.

The speed and diameter of the rolls are not too critical, but they do affect the results. Generally a relatively slow speed is desired for convenience of the workman, and a small diameter upper roll is desirable so as to reduce the length of the area being worked.

While I have illustrated the use of a machine having two pressure rolls to accomplish the desired shaping of the bimetallic blank to conical shape, it is to be understood that other apparatus may be used. It is only essential that successive lateral areas of the sintered facing be progressively mechanically worked to achieve what I call directional working. For example, if the bimetallic blank is fed longitudinally between a pair of reciprocating hammers having faces of relatively small length longitudinally of the blank, blending will be obtained. In other words, any mechanical working which will progressively treat successive lateral areas of the sintered facing to elongate the facing in a controlled manner will achieve the desired result. This is accomplished by applying pressure to laterally extending areas of the article successively and progressively along the length of the article, the amount of pressure being controlled to elongate the more plastic facing to a sufficiently greater extent than the less plastic backing member to bend the article to the predetermined curvature. During this application of pressure, the amount of pressure is adjusted so as to be of gradually increasing amount from one edge to the other edge of the article so as to bend one edge to the desired smaller radius of curvature and form a conical article.

The term "mechanically working" is used in its common sense in the art as referring to the process of subjecting metal to pressure exerted by rolls, presses, or hammers, to change its form.

While I have used the terms "cylindrical" and "conical" to describe the rolls, jigs and the curved bimetallic blanks, it is of course apparent that the blanks as well as the jigs are not truly cylindrical nor conical but are merely segments of these shapes. However, the terms "cylindrical" and "conical" are intended to cover these modifications as well as true and complete cylinders and cones.

In the above description, I have described the blank as having lateral and longitudinal dimensions and as being fed longitudinally between the pressure rolls or with its length disposed in the direction of movement. This was done for purposes of illustration only since the direction of bending is independent of the flat dimensions of the blank and is controlled solely by the direction in which successive lateral areas are progressively mechanically worked. Thus, by the term longitudinally, I refer only to the direction of the progressive mechanical working and by the term lateral I refer to a direction at right angles to this. In other words, if the blank 1 of Figs. 1–3 is passed between the pressure rolls so that its length is parallel to the axis of the rolls, the bending will be in a plane having an axis parallel to the lengthwise center line of the blank.

The above description and examples are regarded as illustrative only in order to thoroughly describe my invention, and it is contemplated that there are numerous modifications and changes which may be made without departing from the spirit of the invention or scope of the appended claims.

I claim:
1. The method of bending to a predetermined conical shape, a flat bimetallic article of the type having a more plastic facing bonded to a less plastic backing member which comprises the steps of applying pressure to laterally extending areas of the article successively and progressively along the length of the article with the pressure applied to each area gradually increasing in amount from one side to the other side of the article and controlling the amount of the pressure so as to elongate the more plastic facing to a sufficiently greater extent than the less plastic backing member and with one longitudinal edge of the facing being elongated to a sufficiently greater extent than the other edge to bend the article to the predetermined conical shape and produce a curved article having an outer more plastic facing substantially free from cracks.

2. The method of bending to a predetermined conical shape a flat bimetallic article of the type having a more plastic facing bonded to a less plastic backing member which comprises the steps of passing said flat article between a pair of opposed pressure rolls and adjusting the pressure applied by said rolls to elongate the more plastic facing to a sufficiently greater extent than the less plastic backing member and with one longitudinal edge of the facing being elongated to a sufficiently greater extent than the other edge to bend the article to the predetermined conical shape and produce a curved article having an outer more plastic facing substantially free from cracks.

3. The method of claim 2 in which the blank is of uniform transverse cross section and in which at least one of said pressure rolls has a conical surface.

4. The method of bending to a predetermined conical shape a flat bimetallic article of the type having a more plastic facing bonded to a less plastic backing member which comprises the steps of providing a curved metal jig having a convex outer surface corresponding to the final shape desired for the article and being of graduated thickness in transverse cross section, disposing said article on said jig with the backing member adjacent to said surface and passing said blank and jig simultaneously between a pair of parallel opposed pressure rolls and adjusting the pressure applied by said rolls to elongate the more plastic backing member and with one longitudinal edge of the facing being elongated to a sufficiently greater extent than the other edge to bend the article to the predetermined conical shape and produce a curved article having an outer more plastic facing substantially free from cracks.

FRANCIS J. LOWEY.

REFERENCES CITED

The following references are of record in the file of this patent:

UNITED STATES PATENTS

| Number | Name | Date |
|---|---|---|
| 165,819 | Hahn | July 30, 1875 |
| 936,389 | Wadsworth | Oct. 12, 1909 |
| 1,093,950 | Shoemaker | Apr. 21, 1914 |
| 1,167,556 | Groehn | Jan. 11, 1916 |
| 1,580,647 | Breck | Apr. 13, 1926 |
| 1,703,416 | Donaldson | Feb. 26, 1929 |
| 1,715,265 | Ayers | May 28, 1929 |
| 2,040,442 | Nieman | May 12, 1936 |
| 2,073,174 | Potter | Mar. 9, 1937 |
| 2,198,254 | Koehring | Apr. 23, 1940 |
| 2,289,311 | Wellman | July 7, 1942 |
| 2,327,706 | Halstead | Aug. 24, 1943 |
| 2,332,737 | Marvin et al. | Oct. 26, 1943 |
| 2,337,588 | Calkins | Dec. 28, 1943 |
| 2,372,607 | Schwartzkoff | Mar. 27, 1945 |

FOREIGN PATENTS

| Number | Country | Date |
|---|---|---|
| 11,283 | Great Britain | June 11, 1894 |